United States Patent [19]

Sato

[11] Patent Number: 5,729,764
[45] Date of Patent: Mar. 17, 1998

[54] BUS INTERFACE CIRCUIT OF INTEGRATED CIRCUIT AND INPUT/OUTPUT BUFFER CIRCUIT

[75] Inventor: Satoshi Sato, Tokyo, Japan

[73] Assignee: Casio Computer Co., Ltd., Tokyo, Japan

[21] Appl. No.: 412,759

[22] Filed: Mar. 29, 1995

[30] Foreign Application Priority Data

Mar. 31, 1994 [JP] Japan .................................. 6-063258

[51] Int. Cl.$^6$ .................................................. G06F 3/00
[52] U.S. Cl. ................... 395/872; 395/309; 365/189.05; 365/206
[58] Field of Search .................. 395/250, 849, 395/872, 851, 309; 365/189.05, 220, 930.08, 206

[56] References Cited

U.S. PATENT DOCUMENTS

| | | | |
|---|---|---|---|
| 4,468,753 | 8/1984 | Berger | 395/309 |
| 4,739,323 | 4/1988 | Miesterfeld | 340/825.5 |
| 4,837,736 | 6/1989 | Donaldson et al. | 395/184.01 |
| 4,866,309 | 9/1989 | Bonke et al. | 326/57 |
| 5,005,156 | 4/1991 | Takai | 365/189.05 |
| 5,291,080 | 3/1994 | Amagasaki | 327/333 |
| 5,369,611 | 11/1994 | Miura | 365/189.05 |
| 5,378,944 | 1/1995 | Gochi | 326/62 |

*Primary Examiner*—Parshotam S. Lall
*Assistant Examiner*—Viet Vu
*Attorney, Agent, or Firm*—Frishauf, Holtz, Goodman, Langer & Chick

[57] ABSTRACT

A bus interface circuit which can suppress generation of noise includes, between an internal data bus and an external data bus, an AND gate and output buffer connected in parallel with an input buffer. A control signal $a$ is supplied to a control terminal of the output buffer and an inverted signal of the control signal $a$ is supplied to a control terminal of the input buffer. A control signal b is supplied to one input terminal of the AND gate. When no access request is made to an external RAM and external ROM, a CPU enables the control signals $a$ and b to be output as a high-level and a low-level signals, respectively. At that time, a respective output buffer enables corresponding data to pass through, but data on the internal data bus is not output to the external data bus when the AND gate is placed in closed state.

3 Claims, 7 Drawing Sheets

BUS INTERFACE CIRCUIT OF INTEGRATED CIRCUIT AND INPUT/OUTPUT BUFFER CIRCUIT

BACKGROUND OF THE INVENTION

1. Field of the Invention

The present invention relates to an integrated circuit having a built-in bus line and, in particular, to a bus interface circuit for connecting a bus line (internal bus) built in an integrated circuit to a bus line (external bus) formed, for example, on a printed circuit board on which the integrated circuit is mounted.

2. Description of the Related Art

For a present-day electronic apparatus, an IC structure called an LSI device has been employed which contains a CPU, a ROM, a RAM, an input/output circuit, etc., in one chip and connects together these circuit components via an internal bus. Of these LSIs, some devices are equipped with a bus interface circuit section for connection to an external RAM, an external ROM, etc., via a bus line system. Among paging receivers used in a radio calling system for example, some have an expanded RAM, etc., in this type of LSI to store more information.

FIG. 1 is a block diagram showing a paging receiver with an external ROM and external RAM connected thereto. A radio unit 1 is of such a type that it demodulates a digital signal received by an antenna 2 and outputs the demodulated signal to a random logic unit (decoder unit) 31.

The random logic unit 31 decodes a demodulated digital signal coming from the radio unit 1 and judges whether or not an ID code in that received data coincides with an ID code of a user's own device stored in an ID-ROM 4. If there is a coincidence, succeeding digital data continues being received and decoded for output to an internal bus 32. If, on the other hand, there is a non-coincidence, data reception discontinues.

CPU 33 executes receive-processing, etc., in accordance with a control program stored in ROM 34 and enables received data which comes from the random logic unit 31 to be stored in a RAM 35. Further, CPU 33 sends an instruction to an input/output (I/O) circuit 36, informing the user's own device of an arrival of an incoming call. CPU 33 sends an instruction to the input/output circuit 36, enabling a received massage to be displayed on a display 6 and keyed-in data at a keying-in section 7 to be detected, etc.

The internal bus 32 is connected via an output buffer 37, input/output buffer 38 and output buffer 39 to an external bus 8. The external RAM 9 and ROM 10 for expansion are connected to the external bus 8. Address data is output from the internal bus 32 via the output buffer 37 to the external bus 8 and control signals, such as RD and WR, are output via the output buffer 39 to the external bus 8. Data access is effected between the internal bus 32 and the external bus 8 via the input/output buffer 38. The random logic unit 31, the internal bus 32, CPU 33, ROM 34, RAM 35, input/output circuit 36, output buffers 37 and 39 and input/output buffer 38 are built in one LSI device 3.

The arrangement of the input/output buffer 38 will be explained below with reference to FIG. 2.

The input/output buffer 38 comprises an input tri-state buffer 38a, an output tri-state buffer 38b and an inverter 38c connected to a control terminal of the input buffer 38a. A control signal $\underline{a}$ is supplied to a control terminal of the output buffer 38b and an inverted signal of the control signal $\underline{a}$ which comes from the inverter 38c is supplied to the control terminal of the input buffer 38a. The control signal $\underline{a}$ stays at a high level, except when data is read from the external RAM 9 or external ROM 10, and, at that time, the input buffer 38a is placed in a high impedance state and the output buffer 38b is allowed to have input data to pass through.

When, as set out above, the tri-state output buffer 38b is placed in such "pass through" state, the data output to the internal bus 32 is delivered as it is to the external bus 8. Since the external bus 8 is normally constructed from an interconnected pattern, etc., built in a printed circuit board, any change of the data on the internal bus is transformed into a current change on the interconnected pattern so that an unwanted radiation wave is generated. In the conventional paging receiver, the frequency of an operation clock used in the LSI device is as low as about 32.768 KHz and, further, the operation voltage is also as low as about 1.5 V. Thus the receiver suffers less adverse effect from the above-mentioned radiation wave. If, however, the frequency of the operation clock used in the LSI device is made high on the order of MHz (for example, 1.92 MHz), the operation voltage has to be also made as high as about 3 V so that an adverse influence cannot be disregarded in the receiver. At that time, an unwanted radiation wave is received by the radio unit 1 via the antenna 2 for example, thus lowering an S/N ratio involved. Further, such an unwanted radiation wave enters into the LSI device 3 through an input terminal, thus causing an internal circuit to produce an operation error. In a radio device with the antenna and LSI device contained in the same housing, there is a greater problem of the unwanted radiation wave received by the radio unit via the antenna.

SUMMARY OF THE INVENTION

It is accordingly the object of the present invention to provide a bus interface circuit and an input/output buffer circuit which can suppress the generation of an unwanted radiation wave.

According to an aspect of the present invention, there is provided a bus interface circuit arranged in an integrated circuit device to connect an internal bus of the integrated circuit device to an external bus arranged in the outside of the integrated circuit device, the bus interface circuit comprising: a first output buffer for outputting data on the internal bus to the external bus; an input buffer for inputting data on the external bus into the internal bus; and means for controlling data outputting by the first output buffer and data inputting by the input buffer; wherein the controlling means disables the data outputting from the first output buffer during a time period when data processing is effected only in the integrated circuit device.

According to another aspect of the present invention there is provided an input/output buffer circuit of an integrated circuit device, comprising: an output buffer, connected between an internal data signal line and an input/output terminal to which an external data signal lines is connected, for outputting data; an input buffer, connected between the internal data signal line and the input/output terminal in parallel to the output buffer, for inputting data; and means for controlling data outputting by the output buffer and data inputting by the input buffer; wherein the controlling means disables the data outputting from the output buffer during a time period when data processing is effected only in the integrated circuit device.

In the present invention, when data is to be written, for example, in a memory device connected to the external bus, the controlling means gate is opened to enables the data output from the first output buffer to the external bus. When data is written into, or read out of, a memory device connected to the internal bus, the controlling means disables the data output from the first output buffer to the external bus.

As a result, since a variation of data on the inner bus exerts no adverse influence on the external bus, it is possible to prevent radiation of an unwanted wave from the external bus. With the apparatus having a radio circuit in particular, less noise (unwanted radiation wave) is radiated from the external bus, preventing the S/N radio of the radio circuit form being degraded by noise involved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be explained below with reference to the accompanying drawings.

(First Embodiment)

Figure 1:
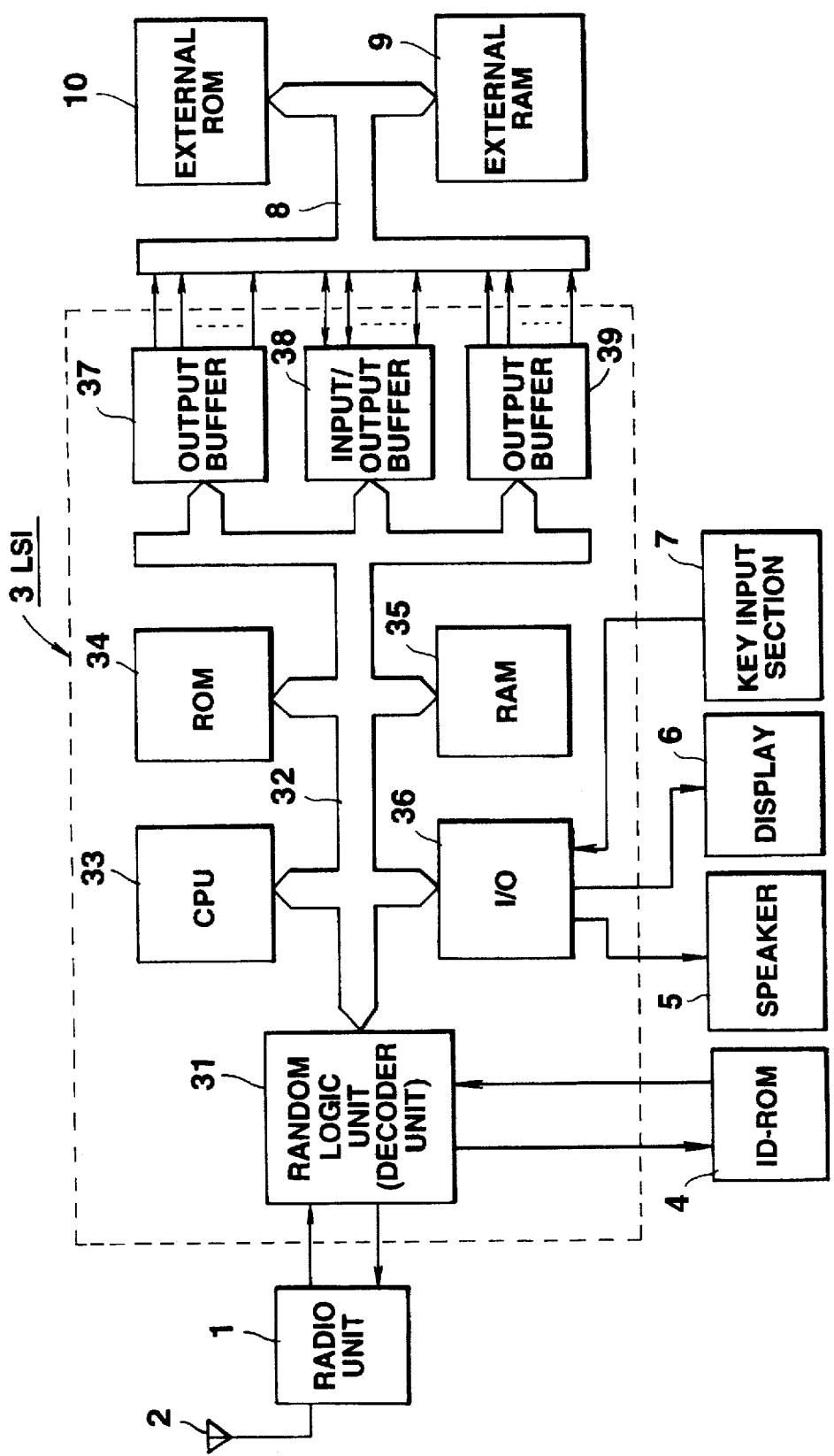
FIG. 1 is a block diagram showing a conventional paging receiver.
Figure 2:
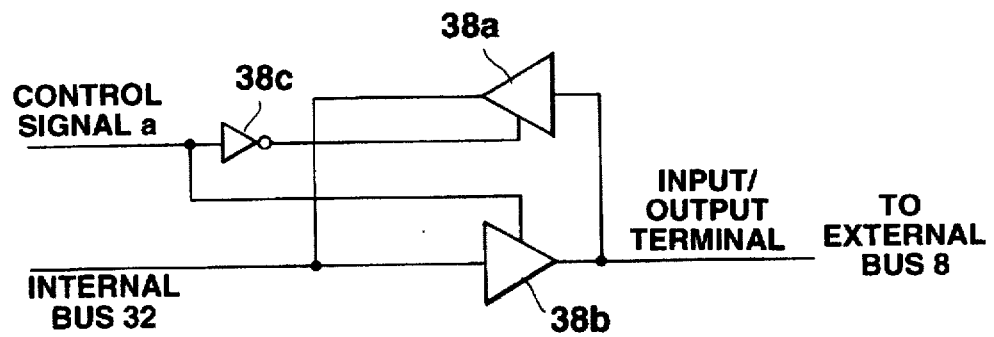
FIG. 2 is a view showing an arrangement of a conventional input/output buffer.

The embodiment as set out below is shown as applying a bus interface circuit of the present invention to a paging receiver. The paging receiver of the present embodiment has basically the same arrangement as that of the conventional paging receiver as shown in FIG. 1 except for the bus interface circuit and any further explanation is, therefore, omitted with the same reference numerals employed in the present embodiment to designate parts or elements corresponding to those shown in FIG. 1.

Figure 3:
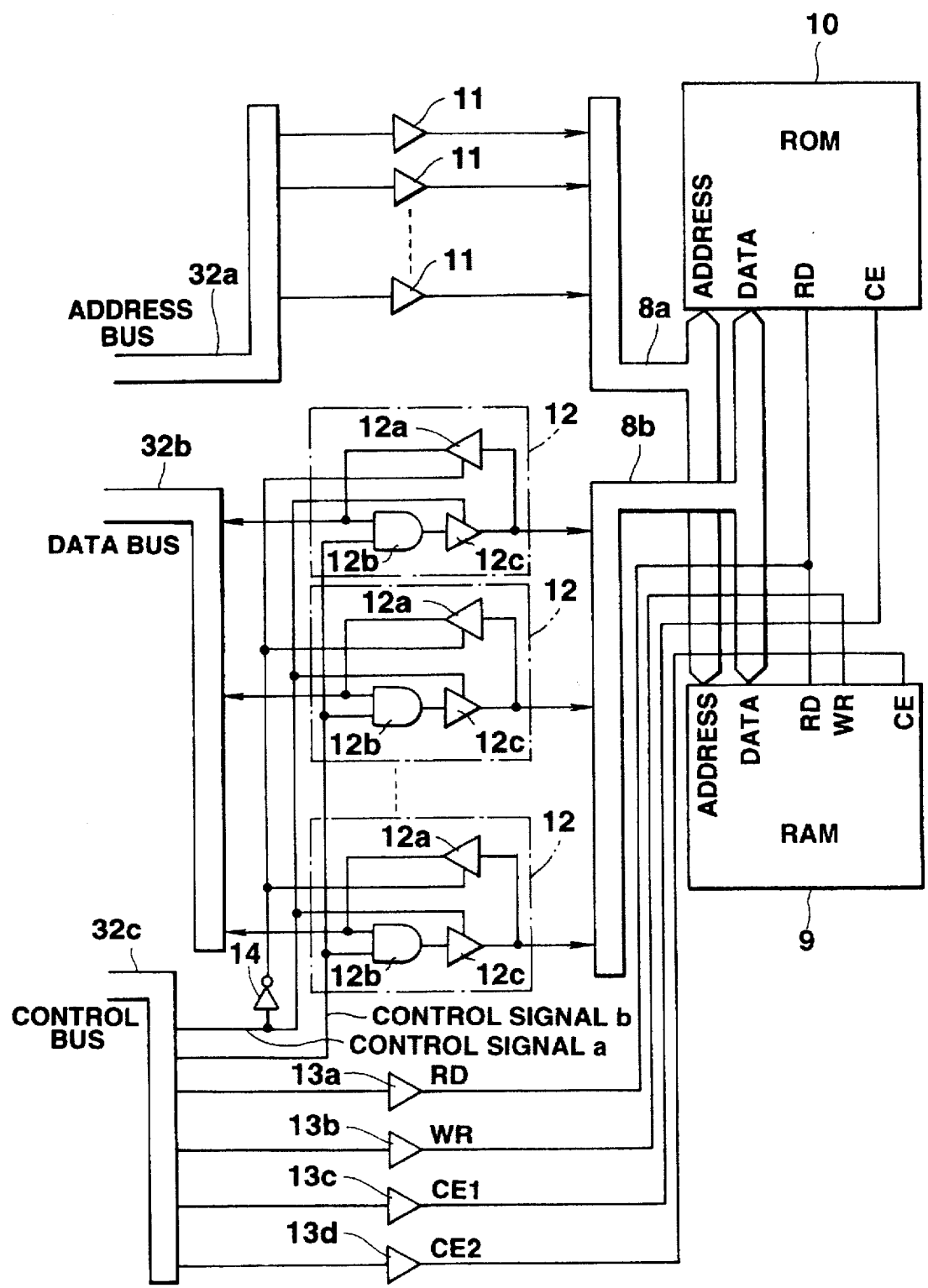
FIG. 3 is a circuit diagram showing a bus interface circuit according to the first embodiment of the present invention, which is used in a paging receiver.

FIG. 3 illustrated a circuit arrangement showing a bus interface circuit according to the first embodiment of the present invention. In the circuit as set out above, an internal bus 32 comprises an internal address bus 32a, an internal data bus 32b and a internal control bus 32c and an external bus 8 comprises an external address bus 8a, an external data bus 8b and external control signal lines.

The respective signal lines of the internal address bus 32a are connected respectively through output buffers 11 to the corresponding signal lines of the external address bus 8a. The signal lines of the internal data bus 32b and those of the external data bus 8b are connected to an input/output buffers 12.

The input/output buffer 12 comprises an input buffer 12a for delivering data of the external data bus 8b to the internal data bus 32b, an AND gate 12b supplied with the data of the internal bus 32b and a control signal b, and an output buffer 12c for delivering the output of the AND gate 12b to the external data bus 8b. An inverted signal ā of a control signal a is supplied via an inverter 14 to a control terminal of the input buffer 12a, and a control signal a is supplied to a control terminal of the output buffer 12c.

Figure 4:
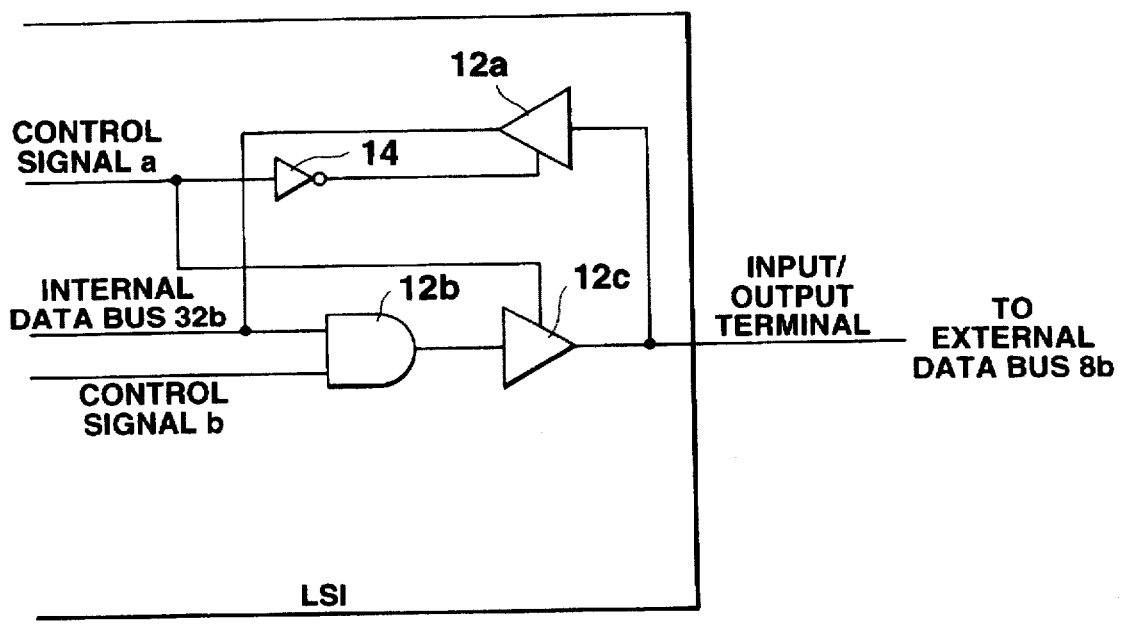
FIG. 4 is a view showing an arrangement of an input/output buffer in the bus input/output circuit in FIG. 3.

That is, the arrangement of the input/output buffer 12, being so represented as to correspond to the conventional input/output buffer 38, is as shown in FIG. 4.

Figure 5:
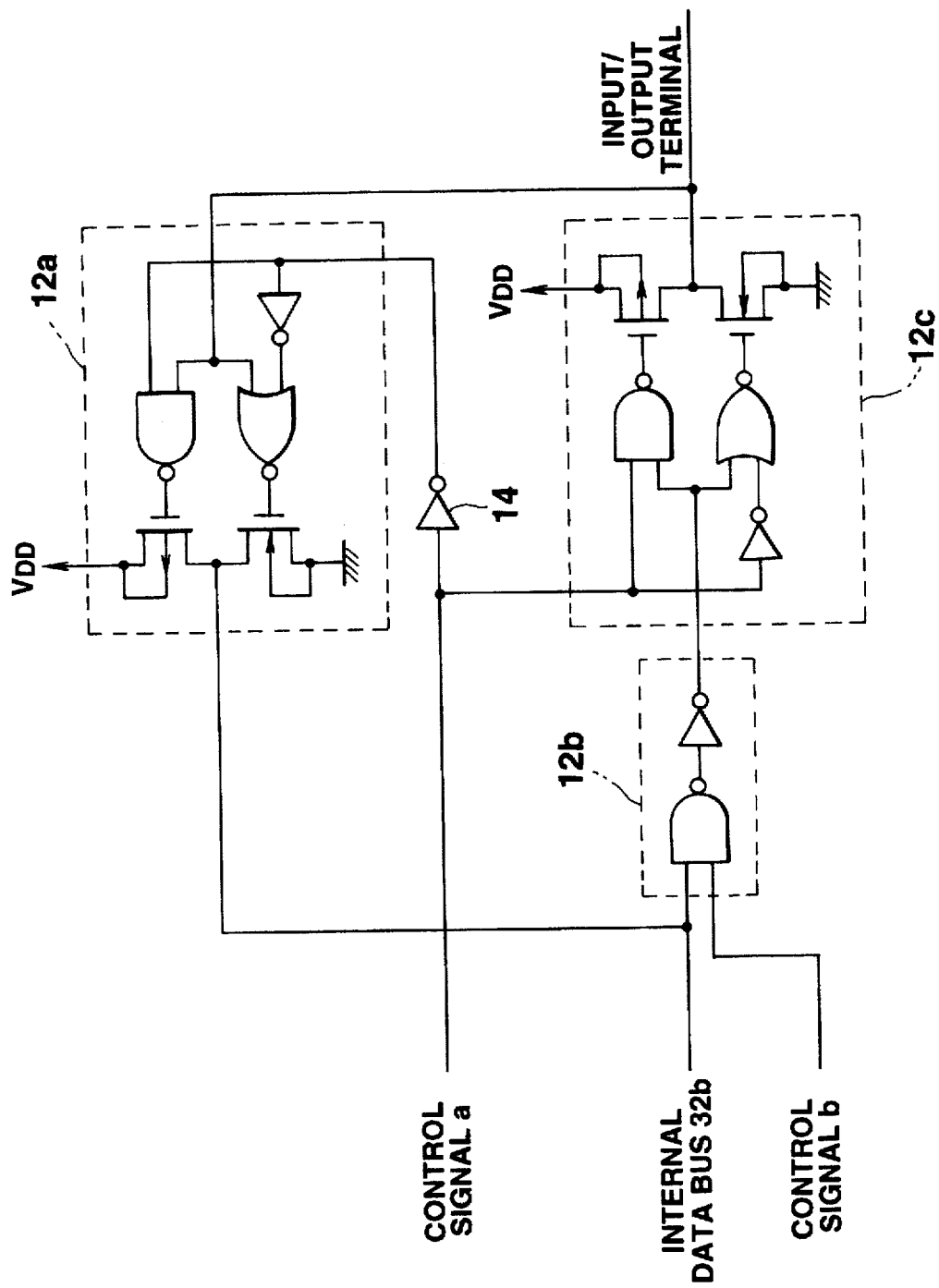
FIG. 5 is a detailed circuit diagram showing an input/output buffer in FIG. 3.

FIG. 5 is a somewhat detailed view of the input/output buffer 12 in FIG. 4. A circuit as shown in FIG. 5 basically provides a logic circuit, and it is represented by NAND circuits, NOR circuits and inverters, which are easy to be matched to MOS transistors. Tri-state buffers 12a and 12c each comprises P-channel and N-channel MOS transistors connected across a power supply VDD and ground, NAND circuit, NOR circuit and inverter circuit. An AND circuit 12b comprises the NAND circuit and inverter circuit.

A read signal RD output buffer 13a, a write signal WR output buffer 13b, a chip enable signal CE1 output buffer 13c and a chip enable signal CF2 output buffer 13d are connected between the external control signal lines and the corresponding signal lines of the internal bus 32c. The read signal RD is supplied to RD terminals of an external RAM 9 and external ROM 10 and a write signal WR is supplied to a WR terminal of the external RAM 9. A chip enable signal CE1 is supplied to the CE terminal of the external ROM 10 and a chip enable signal CE2 is supplied to a CE terminal of the external RAM 9.

A CPU 33 can effect addressings of the external ROM 10 and external RAM 9 in addition to the internal ROM and the internal RAM. A control signal b becomes a high level only when data is written through the address designation of the external RAM 9.

Here, explanation will be given below on the operation of the bus interface circuit (see FIGS. 1 and 3).

When data is to be read out from the external ROM 10, CPU 33 outputs a chip enable signal CE1 for enabling the external ROM 10, a read signal RD and a low-level control signal a. In this case, the respective input buffer 12a has its output allowed to pass through and the respective output buffer 12c becomes a high impedance state.

At this time, address data for designating a specific address at the external ROM 10 is delivered as an output to the internal address bus 32a. The address data is delivered through the output buffer 11 to the external address bus 8a to allow access to be gained to the external ROM 10. Data designated by the address data is read out from the external ROM 10 and delivered as an output to the external data bus 8b. At this time, since the input buffer 12a in the input/output buffer 12 is allowed to have its output pass through, the data read out from the external ROM 10 is delivered past the respective input buffer 12a to the internal bus 32b.

When data is to be read out from the external RAM 9, CPU 33 outputs a chip enable signal CE2 for enabling the external RAM 9, a read signal RD and a low-level control signal a. By doing so, the respective input buffer 12a in the input/output buffer 12 is allowed to have its output pass through and the respective output buffer 12b becomes a high impedance state.

At this time, address data for designating a specific address of the external RAM 9 is delivered as an output to the internal address bus 32a. The address data is output through the output buffer 11 to the external address bus 8a. The data designated by the address data is read out form the external RAM 9 and delivered as an output to the external data bus 8b. At this time, the input buffer 12a is allowed to have its output pass through so that the data output from the external RAM 9 is delivered as an output to the internal data bus 32b past the input buffer 12a.

When, on the other hand, data is to be written into the external RAM 9, CPU 33 outputs a chip enable signal CE2 for enabling the external RAM 9, a write signal WR, a high-level control signal a and a high-level control signal b. By doing so, the respective input buffer 12a is placed in a high impedance state and the respective output buffer 12c is allowed to have its output pass through. Further, the respective AND gate 12b is turned ON to allow the data which is supplied to the other input terminal of the AND gate 12b to be delivered as it is as an output.

At this time, the address data for designating a specific address of the external RAM 9 is output from the internal address bus 32a via the buffer 11 to the external address bus 8a. A write address of the external RAM 9 is designated by the address data. At this time, the output buffer 12c is allowed to have its output pass through, and the AND gate 12b is also turned ON. Therefore, the data output to the internal data bus 32b is delivered via the AND gate 12b and output buffer 12c to the external data bus 8b and written into the corresponding address in the external RAM 9.

When no access is requested to the external ROM 10 and external RAM 9, that is, access is requested to internal ROM 34 or internal RAM 35 in the LSI device, CPU 33 outputs of a high-level control signal a and a low-level control signal b. By doing so, the output buffer 12c is allowed to have its output pass through, but one input terminal side of the AND gate 12b becomes a low level, thus turning the AND gate 12b OFF. As a result, the data of the internal data bus 32 is not output from the AND gate 12b, so that it is not output to the external data bus 8b. At that time, the respective input buffer 12a is placed in a high impedance state and complete isolation is achieved between the internal data bus 32b and the external data bus 8b.

Since no access is gained to the external ROM 10 and external RAM 9, isolation is ensured between the internal data bus 32b and the external data bus 8b, thus preventing an unwanted radiation wave from being produced as noise and received by a radio unit 1.

Figure 6:
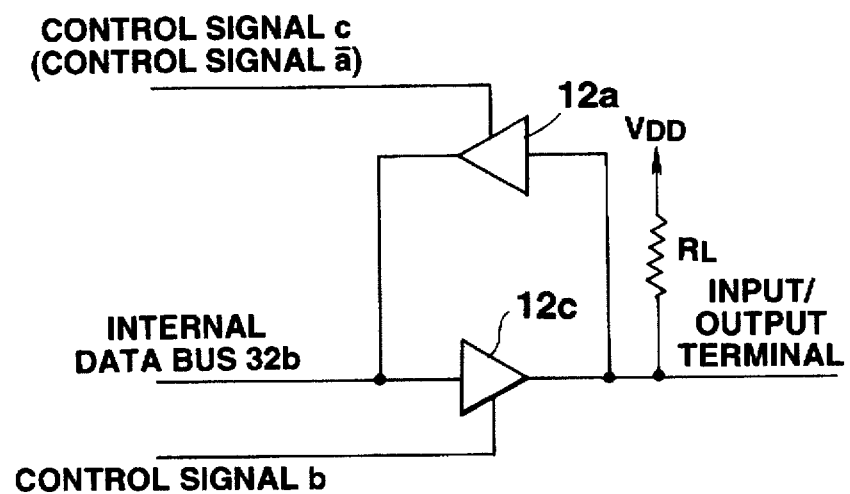
FIG. 6 is a circuit diagram showing another input/output buffer in FIG. 3.

FIG. 6 in a circuit diagram showing another input/output buffer in FIG. 3. FIG. 6 shows an example in which the output terminal is connected to a power supply potential VDD through a load resistor RL.

Although, in order to prevent a variation of data on the internal data bus 32b from leaking into the external data bus 8b, the AND gate 12b is provided in the input side of the output tri-state buffer 12c in the above-mentioned embodiment and controlled by the control signal b which becomes a high level only when data is written in the external RAM 9, the output tri-state buffer 12c may be directly controlled by the control signal b. FIG. 6 shows this practical form of the circuit. As shown in FIG. 6, an input/output buffer 12 comprises an input tri-state buffer 12a and an output tri-state buffer 12c. The input tri-state buffer 12a is controlled by a control signal c, that is, an inverted signal $\bar{a}$ of the control signal, which becomes a high level during a time period in which data is read from the external RAM 9 and external ROM 10 and a low level during the other time period. The output tri-state buffer 12c is controlled by the above-mentioned control signal b. In the arrangement above, when the control signals b and c are both in low levels, the output tri-state buffer 12c is placed in a high impedance state and a potential on the output terminal of the input/output buffer 12 is placed in a floating state. It is, therefore, preferable to connect the output terminal to a power supply potential or a ground potential via load resistor in the LSI device 3.

(Second Embodiment)

Figure 7:
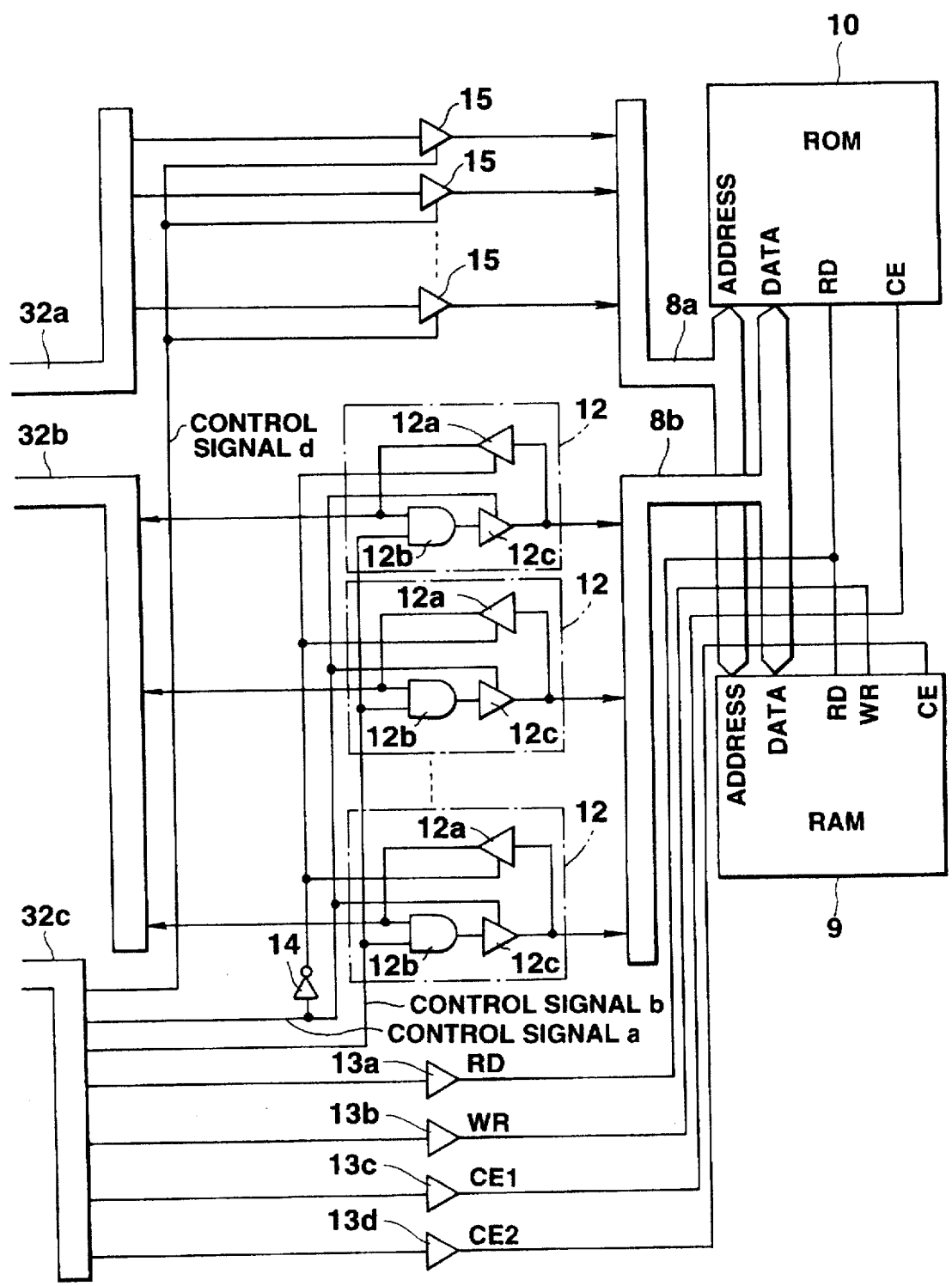
FIG. 7 is a circuit diagram showing a bus interface circuit according to the second embodiment of the present invention.

FIG. 7 is a circuit diagram showing a bus interface circuit according to the second embodiment of the present invention.

In the above-mentioned first embodiment, many of data processings in the LSI device 3 are performed while incrementing address one at a time. Even at the address change time, only data on one or two of signal lines of the address bus 32a vary and hence an interface between the signal lines of the internal address bus 32a and the signal lines of the external address bus 8a can be so simplified as to connect only output buffers 11 across these two signal lines.

However, the interface of the address bus may be so constructed, as in the case of the interface of the data bus, as to achieve complete separation between the internal address bus 32a and the external address bus 8a during other than a period in which access is gained to the internal address bus 32a and the external address bus 8a. FIG. 7 shows one form of this arrangement.

In the bus interface circuit as shown in FIG. 7, the output buffers 11 for address which are in the bus interface circuit shown in FIG. 3 are replaced by tri-state buffers 15 and a high-level signal is supplied as a control signal d to control terminals of the tri-state buffers 15 during a time period in which access is gained to the external ROM 10 and external RAM 9 and a low-level signal is supplied as a control signal d to the control terminals of the tri-state buffers 15 during the other time period. By doing so, it is possible to prevent generation of an unwanted radiation wave not only at the external data bus 8b but also at the external address bus 8a.

(Third Embodiment)

Figure 8:
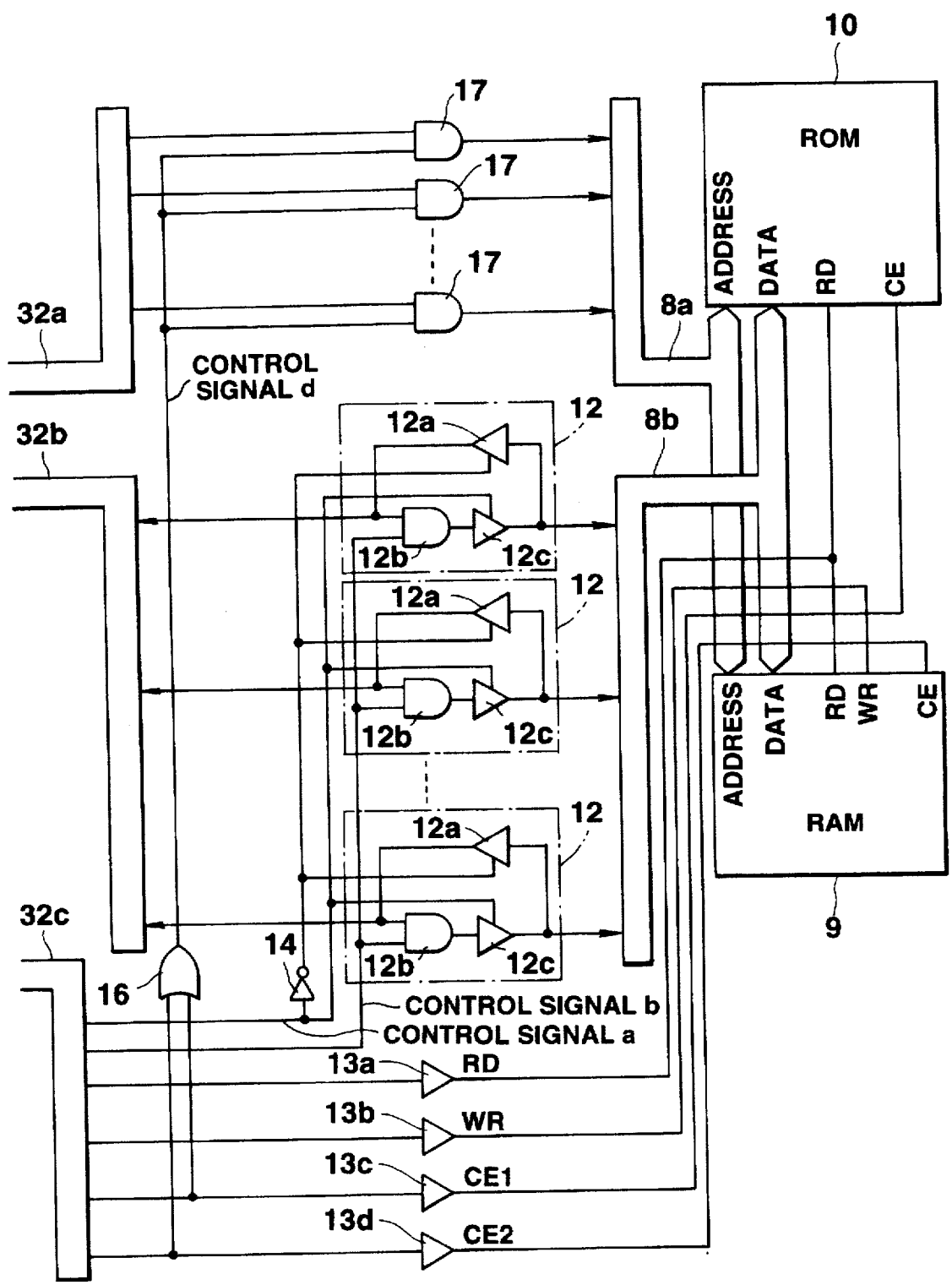
FIG. 8 is a circuit arrangement showing a bus interface circuit according to the third embodiment of the present invention.

FIG. 8 shows another practical form of a bus interface circuit according to the third embodiment of the present invention. In FIG. 8, first and second input terminals of an OR circuit 16 are connected, respectively, to a chip enable signal CE1 output line and a chip enable signal CE2 output line in the control bus 32c, the output of the OR circuit 16 is used as the control signal d, and AND circuits 17 are employed in place of the tri-state buffers 15.

As the control signal d as set out above, use may be made of other signals, such as chip enable signals. Further, an AND circuit may be used in place of the tri-state buffer 15.

Although the above-mentioned embodiment has been explained in conjunction with the paging receiver, the present invention is not restricted thereto and can be applied to a radio transmitter/receiver unit, a hand-held telephone set, etc., having a radio circuit. The present embodiment can also be effective to suppress an unwanted radiation wave in an apparatus not equipped with any radio circuit.

According to the present invention, if only the internal data bus is employed in the bus interface circuit connecting together the internal and external data buses, isolation can be achieved between the internal data bus and the external data bus so that it is possible to prevent an unwanted wave from being radiated due to a variation on the internal data bus exerting an adverse influence on the external data bus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A bus interface circuit for connecting an internal bus of an integrated circuit device to an external bus arranged outside of the integrated circuit device, said bus interface circuit comprising:
    (i) a plurality of input/output buffers each connected between corresponding signal lines of the internal bus and the external bus, each of said respective input/output buffers including:
        a data inputting tri-state buffer having an input terminal connected to the corresponding signal line of the external bus, and an output terminal connected to the corresponding signal line of the internal bus;
        a data outputting tri-state buffer having an input terminal connected to the corresponding signal line of the internal bus through a control gate, and an output terminal connected to the corresponding signal line of the external bus; and
        a control circuit for setting one of the data inputting and outputting tri-state buffers in an ON state and the other of the data inputting and outputting tri-state buffers in an OFF state, with respect to a single control signal; and
    (ii) control means for controlling the input/output buffers, said control means including:
        means for outputting a first control signal to the control circuit for setting the data outputting tri-state buffer in an operative state, and for setting the data inputting tri-state buffer in a limited operation state whereby the data inputting tri-state buffer operates only when the integrated circuit device receives data from an external device connected to the external bus; and
        means for outputting a second control signal to the control gate for causing the control gate to be closed when the data outputting tri-state buffer is set in the operative state, and for causing the control gate to be opened when the integrated circuit device outputs data to the external device connected to the external bus.

2. The bus interface circuit according to claim 1, further comprising output buffers for outputting data on an internal address bus to an external address bus, and wherein said control means includes means for controlling operation of the output buffers.

3. An input/output buffer circuit for an integrated circuit device, said input/output buffer circuit comprising:
    a data inputting tri-state buffer having an input terminal connected to an external connection terminal, and an output terminal connected to a corresponding signal line in the integrated circuit device;
    a data outputting tri-state buffer having an input terminal connected to a corresponding internal signal line through a control gate, and an output terminal connected to the external connection terminal; and
    a control circuit for setting one of the data inputting and outputting tri-state buffers in an ON state and the other of the data inputting and outputting tri-state buffers in an OFF state, with respect to a single control signal;
    wherein the data inputting tri-state buffer is set in the ON state by a control signal supplied by the control circuit only when data is received from an external device connected to the external connection terminal, and
    wherein the control gate is opened only when data is output to the external device connected to the external connection terminal.

* * * * *